United States Patent [19]
Dahlbom et al.

[11] Patent Number: 6,010,443
[45] Date of Patent: Jan. 4, 2000

[54] CLAMPING RING FOR AN ENCLOSED SHOE PRESS

[75] Inventors: Bo Ingvar Dahlbom, Halmstad; Kenth R. Törnqvist; Lars O. T. Gustavsson, both of Karlstad; U. Mikael Nyman, Forshaga, all of Sweden; L. Stefan Karlsson, Charlotte, N.C.

[73] Assignee: Valmet-Karlstad AB, Karlstad, Sweden

[21] Appl. No.: 08/955,649

[22] Filed: Oct. 22, 1997

Related U.S. Application Data

[60] Provisional application No. 60/049,624, Jun. 13, 1997.

[30] Foreign Application Priority Data

Oct. 22, 1996 [SE] Sweden .................................. 9603884

[51] Int. Cl.⁷ ...................................................... B31F 1/00
[52] U.S. Cl. ........................... 492/20; 492/47; 162/358.3; 162/272
[58] Field of Search ................................ 492/20, 21, 47, 492/48, 45, 22, 26; 29/895.2; 162/358.3, 358.4, 358.5, 272, 361

[56] References Cited

U.S. PATENT DOCUMENTS

| | | | |
|---|---|---|---|
| 763,251 | 6/1904 | Breck | 492/121 |
| 808,004 | 12/1905 | Bryant | 492/21 |
| 1,222,501 | 4/1917 | White | 492/21 |
| 1,395,317 | 11/1921 | Warner | 492/21 |
| 1,413,436 | 4/1922 | Vedder | 492/21 |
| 2,749,133 | 6/1956 | Rich | 492/21 |
| 3,581,659 | 6/1971 | Bryer | 101/153 |
| 3,902,233 | 9/1975 | Ohtsu | 492/1 |
| 4,021,900 | 5/1977 | Gibson et al. | 492/1 |
| 4,545,425 | 10/1985 | Johansson | 165/89 |
| 4,995,147 | 2/1991 | Ahrweiler et al. | 492/16 |
| 5,098,523 | 3/1992 | Ilmarinen et al. | 162/358 |
| 5,329,849 | 7/1994 | Roerig | 100/162 B |
| 5,342,277 | 8/1994 | Steiner et al. | 492/56 |
| 5,522,785 | 6/1996 | Kedl et al. | 492/21 |
| 5,613,546 | 3/1997 | Delassus et al. | 164/428 |
| 5,665,044 | 9/1997 | Tomat et al. | 492/47 |
| 5,700,357 | 12/1997 | Didier | 162/358.3 |
| 5,851,168 | 12/1998 | Schneid et al. | 492/7 |
| 5,885,201 | 3/1999 | Brown et al. | 492/7 |

FOREIGN PATENT DOCUMENTS

90120 9/1993 Finland .

*Primary Examiner*—David P. Bryant
*Assistant Examiner*—Marc W. Butler
*Attorney, Agent, or Firm*—Alston & Bird LLP

[57] ABSTRACT

An elastic clamping ring for an enclosed shoe press roll used to clamp the jacket to the gables of the shoe press roll is disclosed. A rigid clamping ring is arranged on the inner side of each gable to form a groove which opens outwardly in the radial direction and in which the elastic clamping ring is received. A stop member is arranged radially outside the elastic clamping ring. By operation of securing members, the rigid clamping ring is forced in the direction of the peripheral gable part in order to squeeze the elastic clamping ring such that it expands outwardly in the radial direction and clamps the edge of the jacket between itself and the stop member. The invention also relates to a shoe press roll that uses an elastic clamping ring with a hexagonal cross section for clamping of the jacket of the shoe press roll to the gables of the shoe press roll.

8 Claims, 5 Drawing Sheets

CLAMPING RING FOR AN ENCLOSED SHOE PRESS

CROSS-REFERENCE TO RELATED APPLICATIONS

This application claims the benefit of U.S. Provisional Application No. 60/049,624, filed Jun. 13, 1997.

FIELD OF THE INVENTION

The present invention relates to press rolls for paper or board machines, and more particularly relates to press rolls having a flexible outer jacket.

BACKGROUND OF THE INVENTION

For the production of paper and board, the use of shoe presses, i.e. presses with an extended nip, has become increasingly widespread. In such a press, a press nip is formed between a rotating roll and a concave shoe whereby a flexible endless band or belt runs around the concave shoe. The earliest shoe presses were of the so called open type where the flexible endless belt was not closed at its edges. This caused problems since a lubricant must be supplied between the shoe and the flexible belt. For this reason, an open shoe press entails the problem of lubricant leakage that results in a high consumption of lubricant as well as a risk that the paper web comes into direct contact with the lubricant, which is usually oil. Modern shoe presses are therefore usually manufactured in the shape of so called enclosed shoe presses.

In an enclosed shoe press, a press roll is used that comprises a concave pressure shoe and two gables or end walls. The endless flexible band consists of a tubular jacket impervious to liquid that runs over the concave shoe and which is fixed at its edges to peripheral parts of the gables. The tubular jacket is thereby closed at its ends such that the problems associated with leakage of the lubricant are eliminated. The fixing to the gables of the edges of the jacket is thus an essential feature of the enclosed shoe press and a number of different solutions for the fixing of the edges of the jacket have been proposed, see for example U.S. Pat. No. 4,975,152 to Filzen et al., U.S. Pat. No. 5,011,578 to Lange et al and U.S. Pat. No. 5,098,523 to Ilmarinen et al.

In Finnish Patent No. 90120 (Tampella Papertech OY), an enclosed shoe press roll is disclosed where the jacket is squeezed by an elastic clamping ring against a stop ring whereby the elastic clamping ring is compressed between an inner or an outer clamping ring of metal and a peripheral gable member and expands radially outward to form a mechanical joint that locks the flexible jacket of the shoe press roll to the gable of the shoe press roll. In Finnish Patent No. 90120, two different types of elastic rings are proposed. According to a first embodiment, an elastic clamping ring with a substantially rectangular cross section is proposed. According to a second embodiment, an elastic clamping ring with a substantially V-shaped cross section is proposed.

U.S. Pat. No. 5,904,813 issued May 18, 1999 and assigned to the assignee of the present application discloses an enclosed shoe press roll which is an improvement over the previously mentioned press roll. A liquid-impervious jacket is secured by the compression action of a rectangular elastic clamping ring as the elastic ring is made to expand radially outward.

Tests have shown that the proposed rectangular cross section is capable of fulfilling its function. However, it has been found that repeated loadings, or loading during long periods of time, can cause a permanent deformation of the rectangular clamping ring such that the cross section of the ring passes from a rectangular shape to a shape that can be described as mushroom-shaped or "chef's-cap shaped". As a result of this phenomenon, problems can arise when the jacket is to be replaced since the elastic clamping ring does not return to its original shape but remains in a position where it still clamps the jacket. Moreover, the rectangular cross section disclosed in Finnish Patent No. 90120 is, as shown in the drawings, shaped in such a way that it has greater height than width. This entails the disadvantage that the elastic clamping ring must be subjected to a relatively high loading in the axial direction of the shoe press roll in order for the ring to be sufficiently deformed to clamp the flexible jacket of the press roll.

The proposed V-shaped cross section can be described in terms of two inclined legs separated by a groove in the ring whereby the groove in the ring faces inwardly. Such a cross section of the elastic clamping ring entails two disadvantages. First, the groove in the ring makes the deformation of the ring during loading more difficult to predict and control. Second, the bottom of the groove is a risk from the point of view of strength and this profile is therefore not suitable in connection with the relatively high loadings the ring will be subject to when it is used.

SUMMARY OF THE INVENTION

The present invention relates to an elastic clamping ring for a shoe press roll, the shoe press roll being provided with a concave pressure shoe and a flexible jacket and intended to cooperate with a counter roll to form a press with an extended nip for paper or board machines. The elastic clamping ring is intended to squeeze the flexible jacket against gables of the shoe press roll. The edge of the jacket, which is located radially outside the elastic clamping ring and radially inside an outer stop member, is squeezed against a gable of the shoe press roll when the elastic clamping ring is compressed between a rigid clamping ring and a part of the gable whereby the clamping ring expands radially and squeezes the jacket against the outer stop member. The invention also relates to a shoe press roll that makes use of such a clamping ring for fixing of the edges of the flexible jacket.

In particular, the present invention comprises an elastic clamping ring for clamping of the flexible jacket in a shoe press roll to the gables of the shoe press roll that can be subjected to repeated loadings and be loaded during long periods of time without risk for such permanent deformation that would make the loosening of the mechanical joint difficult or impossible, for example during change of the flexible jacket. The clamping ring is also suited for being subjected to high loadings and is able to be deformed radially outward without being subjected to unnecessarily high loadings in the axial direction of the press roll.

The elastic clamping ring of the present invention is shaped as a solid body (i.e. without groove or cavity) and has a cross section which is substantially square but which deviates from a square cross section in that two of the edges of the square cross section have been provided with bevels. The clamping ring thereby obtains the shape of a ring having a first and a second planar side surface that are parallel with each other and perpendicular to the axis of the shoe press roll when the clamping ring is mounted on the gable of the shoe press, a third side surface that is smooth and circular cylindrical and that connects the first and the second side surfaces with each other and is perpendicular to the first and the second side surfaces, a fourth side surface which is smooth and circular cylindrical and perpendicular to the first and second side surfaces and concentric with the third side surface, a fifth side surface connecting the first side surface with the fourth side surface and a sixth side surface connecting the second side surface with the fourth side surface. The third side surface is constituted by one single continuous surface which in its entirety is perpendicular to the first and to the second side surface. The fourth side surface and the fifth can be arched in a plane perpendicular to the plane of the first and the second side surface.

According to another embodiment of the invention, the fifth side surface and the sixth side surface can have the shape of a cut cone. In the embodiment where the fifth and sixth side surfaces have the shape of a cut cone, the elastic clamping ring will have the cross section of a hexagon with sides of different length. In cross section, the elastic clamping ring will thus have the following shape when the fifth and sixth side surfaces have the shape of a cut cone; a first straight side corresponding to the first planar side surface, a second straight side corresponding to the second planar side surface, the second straight side being parallel to the first straight side, a third straight side corresponding to the third side surface, the third side being perpendicular to the first and the second straight side, a fourth straight side corresponding to the fourth side surface, the fourth side being parallel with the third straight side and perpendicular to the first and the second straight sides, a fifth straight side corresponding to the fifth side surface, the fifth straight side connecting the first straight side with the fourth straight side and forming an angle with both the first straight side and the fourth straight side, a sixth straight side corresponding to the sixth side surface, the sixth straight side connecting the second straight side with the fourth straight side and the sixth straight side forming an angle with the second straight side and the fourth straight side.

When the elastic clamping ring is used, the clamping ring is placed at a peripheral gable member of a shoe press roll for clamping of the flexible jacket of the shoe press roll. The shoe press roll, which is intended to cooperate with a counter roll to form a press with an extended nip, comprises two gables, a tubular flexible jacket which is impermeable to liquids and which is locked at its edges by the elastic clamping ring to peripheral gable members and stationary carrying elements for supporting the gables. The gables include bearing members arranged to permit rotation of the jacket and a section of each gable located radially outside of the bearing member in relationship to the stationary carrying elements whereby the press roll comprises a pressure shoe intended to form together with the counter roll a press zone with an extended nip through which the jacket is moved in sliding contact with the pressure shoe. A rigid clamping ring is screwed on the inside of the gable member by means of a plurality of clamping bolts in order to squeeze the elastic clamping ring, which can be expanded radially outward, between the rigid clamping ring and the inside of the gable member such that the edge of the jacket is clamped against a stop member arranged radially outside the elastic clamping ring.

The elastic clamping ring has, as has been mentioned above, a first and a second side surface, the first and second side surfaces both being planar and parallel with each other, a third side surface facing away from the jacket and connecting the first and second side surfaces with each other, a fourth side surface which is circular cylindrical and faces the jacket, the fourth side surface being perpendicular to the first side surface and the second side surface, a fifth side surface connecting the first side surface to the fourth side surface and a sixth side surface connecting the second side surface with the fourth side surface. Moreover, the clamping ring forms a solid body and has no groove or internal cavity.

DETAILED DESCRIPTION OF THE INVENTION

Figure 1:
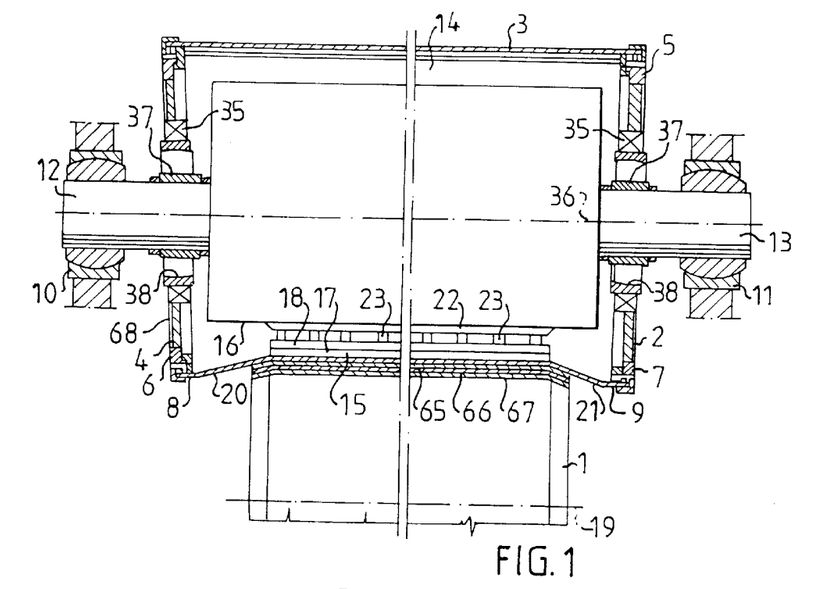
FIG. 1 schematically shows parts of a wet press having a press roll comprising gables.
Figure 2:
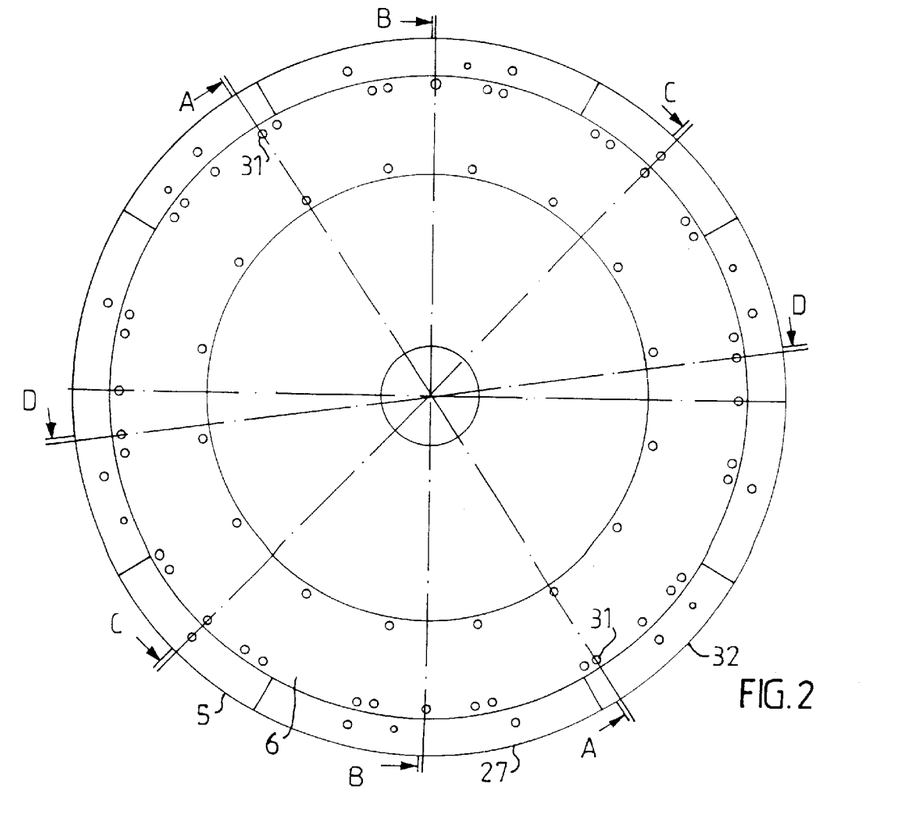
FIG. 2 shows an elevation view of one of the gables according to FIG. 1.

With reference to FIG. 1, this figure schematically shows parts of a wet press arranged in the wet section of a paper machine or a board machine in order to press water out of and to consolidate a formed wet fibrous web 65.

The wet press comprises a rotatable counter roll 1 and a shoe press roll 2 having a tubular liquid impervious jacket 3 of a flexible material (also referred to as a "tubular flexible jacket"), such as plastic or rubber, and two opposed circular gables 4, 5 or end walls having peripheral members 6, 7, at which the edge 8, 9 of the jacket (also referred to as "opposed edge portions") is connected in an air and liquid tight manner by means of an endless elastic clamping ring 24 made of a suitable rubber material or rubber-like material. The shoe press roll is mounted in two frame parts 10, 11 by means of carrying elements in the shape of two stationary neck journals 12, 13 with a circular cross section that extends air and liquid sealed through central openings in the gables 4, 5. The gables 4, 5, the jacket 3 and the neck journals 12, 13 thereby enclose a liquid tight chamber 14 that can be sufficiently pressurized, for example 0.5 bar overpressure, such that the gables 4, 5 are moved away from each other to keep the jacket 3 sufficiently stretched. Consequently, the gables 4, 5 are axially displaceable relative to the neck journals 12, 13. Alternatively, spring elements can be arranged in the press roll pressing against the gables or against one of them in order to stretch the jacket in an axial direction. It is also possible to use pneumatic or hydraulic cylinders for this purpose as well as any suitable combination of the arrangements mentioned.

The shoe press roll 2 further comprises a pressure shoe 15, arranged facing the counter roll 1 and forming together with the counter roll a press zone with an extended nip within a predetermined sector of the counter roll 1, where the jacket 3 is thus pressed down against the pressure shoe 15 and runs around a part of the circumference of the counter roll 1. The pressure shoe 15 is carried by an inner support 16 that is fixedly mounted at the inner parts of the neck journals 12, 13.

The fibrous web, which shall be dewatered, is enclosed between two felts, 66, 67, each of which is arranged to run in its own loop over a plurality of rolls (not shown) and through said press zone. In operation, the continuous wet fiber web runs through the press zone together with the felts 66, 67 that absorb liquid pressed from the fibrous web.

The shown pressure shoe 15 consists of a slide part 17 and a frame part 18 and the slide part 17 has a slide surface along which the jacket 3 moves in sliding contact. The pressure shoe 15, which faces the counter roll 1, extends across the jacket 3 parallel to the rotational axis 19 of the counter roll and it has a length that corresponds to or is somewhat less than the length of the counter roll 1, which in turn is somewhat shorter than the shoe press roll 2, such that between the gables 4, 5 and the counter roll 1, sections 20, 21 of the jacket 3 are formed within the area of the press zone which sections 20, 21 are inclined and retracted in relation to the counter roll 1. In the disclosed embodiment, the pressure shoe 15 is connected to the inner support 16 through a jack unit 22 having a plurality of jacks 23 by means of which the pressure of the pressure shoe against the jacket 3 and the fiber web can be regulated. Moreover, there are channel systems (not shown) arranged in the pressure shoe 15 for the supply of lubricant to the slide surface of the slide part 17 such that a friction-reducing film is formed and maintained between the jacket 3 and the pressure shoe 15. The pressure shoe 15 may be provided with hydrostatic pockets (not shown) that are filled with fluid under pressure acting against the inside of the jacket to compress the fiber web in a controlled manner.

Figure 3:
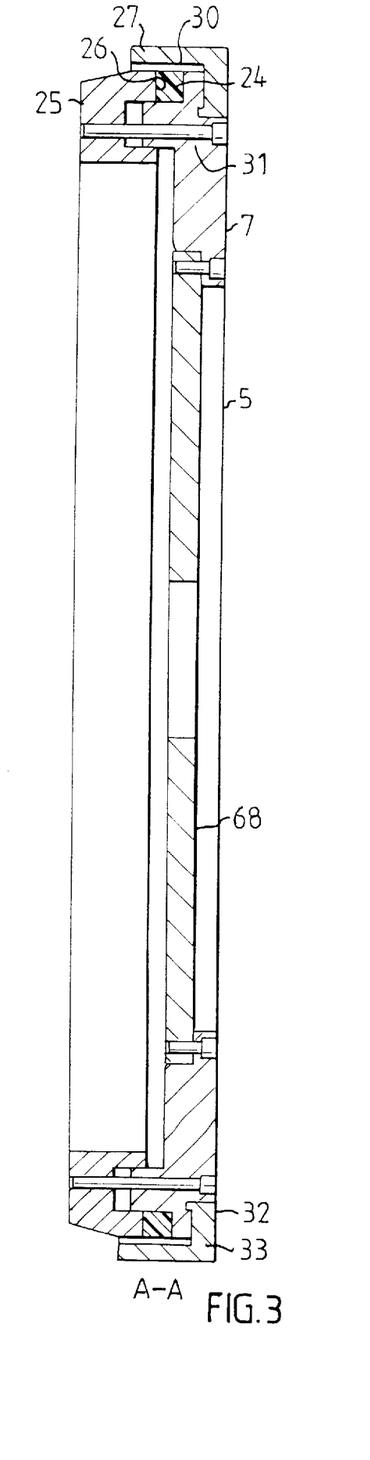
FIG. 3 is a cross sectional view along the line A—A in FIG. 2.

The gables 4, 5 have circular bearing members 35 for rotation of the jacket and the section 68 of each gable, located radially outside the bearing member 35, around a rotational axis 36, of which section 68 the peripheral gable parts 6 and 7 respectively thus form a part together with a center part at which the peripheral gable part is screwed by means of bolts (see FIG. 3). The gable section 68 is rigid and consists of a suitable metallic material. In the embodiment according to FIG. 1, the bearing members 35 consist of anti-friction bearings such as ball bearings or roller bearings. Alternatively, slide bearing with plane or spherical slide surfaces may be used. Furthermore, each gable 4, 5 comprises cylindrical slide bearings 37 arranged such that the gable can be axially displaced in relation to the neck journals 12, 13. Alternatively, only one gable is provided with such a slide bearing 37. In addition, the gables 4, 5 comprise elements 38 that encircle the rotational axis 36 of the jacket and are concentric with the rotational axis, the concentric elements 38 being arranged so that the peripheral gable parts 4, 5 may be freely displaced in the axial direction towards each other and against the pressure shoe 15 or the nip area under influence of the axial tensions that arise in the jacket 3 during its passage through the press zone. The peripheral gable parts 6, 7 can be pulled inward and be given an inclination in the nip area with a small angle of about 0.5°. The local axial tensions will thereby be considerably reduced. The tension-reducing elements 38 may consist of spherical bearings as shown or built-in elastic rings or gable parts.

Since the jacket together with its edges are fixed to the gables, more precisely at the peripheral gable parts 6, 7 and since the concentric elements 38 are arranged to permit free axial displacement inward of the peripheral gable parts 6, 7 within the press zone through the effect of the axial tensions in the jacket 3, the gables 4, 5 will be inclined in a self-adjusting way during operation.

Figure 4:
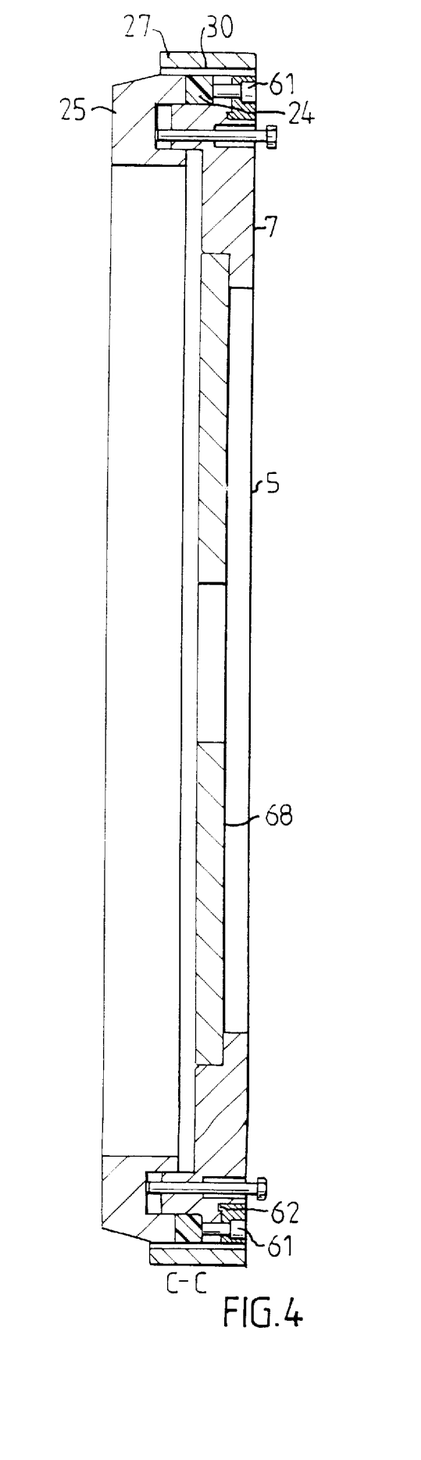
FIG. 4 shows a cross sectional view along the line C—C in FIG. 2
Figure 5:
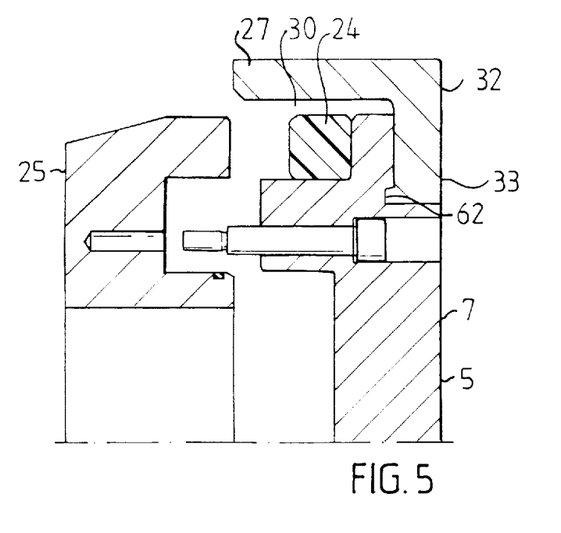
FIG. 5 shows a part of the gable of FIG. 3 before an elastic clamping ring of rectangular cross section has been made to expand radially.
Figure 10:
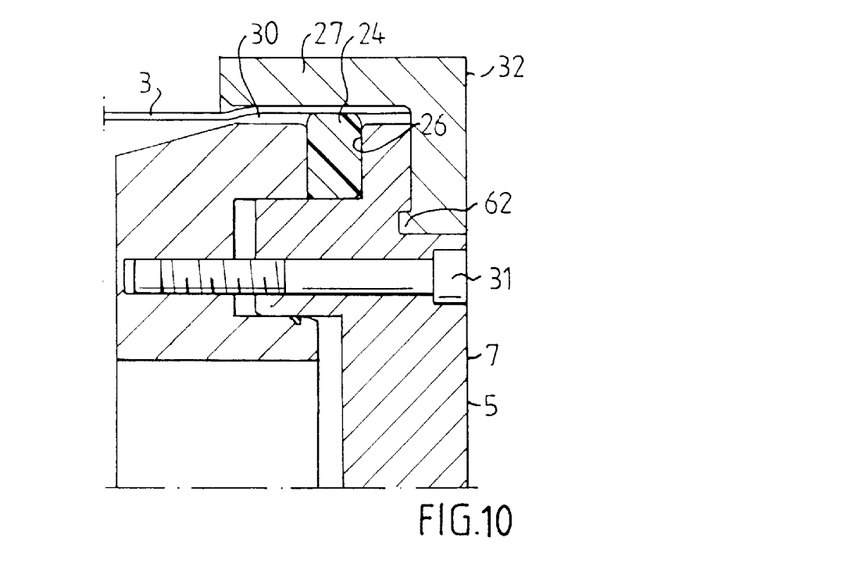
FIG. 10 shows a part of the gable corresponding to FIG. 8 after the elastic clamping ring according to the present invention has been made to expand radially outward.

An endless rigid clamping ring 25 is arranged on the inner side of each gable 4, 5 to form between itself and the peripheral gable part 6, 7 a groove 26 which is open outward in the radial direction. The elastic clamping ring 24 is received in the groove 26. A stop member 27 is arranged radially outside the elastic clamping ring 24 in order to form a concentric slot 30 between itself and opposing cylindric surfaces of the rigid clamping ring 25 and the peripheral gable part 6, 7. The concentric slot 30 is open inwardly to receive the edge 8, 9 of the jacket, initially with a small play. By means of a plurality of axial clamping bolts 31 (also referred to as "securing members") with an even circumferential distribution, the rigid clamping ring 25 is pulled in the direction of the peripheral gable part 6, 7 to squeeze the elastic clamping ring 24 in such a way that it expands radially outward and clamps the edge 8, 9 of the jacket 3 between the elastic clamping ring and said stop member 27 as can be seen in FIG. 10. In the disclosed embodiment, the stop member 27 is formed by one leg of a segmented L-shaped ring 32. At its second leg 33, the ring 32 is screwed by means of bolts 61 to the peripheral gable part 6, 7 (see FIG. 4). The leg 33 has an axial lip 62 resting in a corresponding axial groove in the peripheral gable part 6, 7 in order to absorb the torque load that occurs when the jacket 3 is pressed against the outer leg 27.

Figure 6:
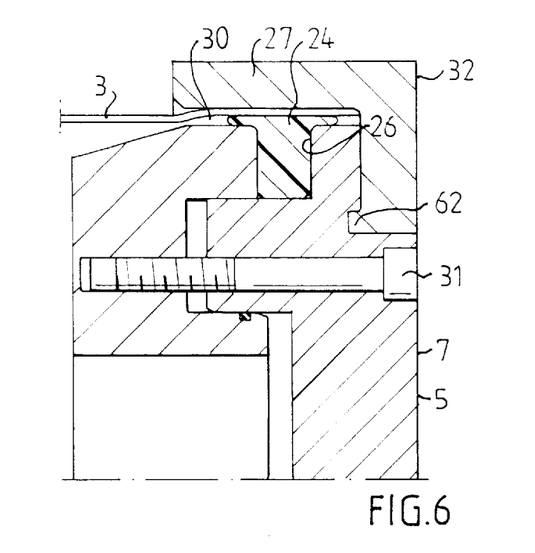
FIG. 6 shows a part of the gable corresponding to FIG. 5 after clamping bolts at the gable have been screwed in with a subsequent expansion of an elastic clamping ring and clamping of the jacket.
Figure 7:
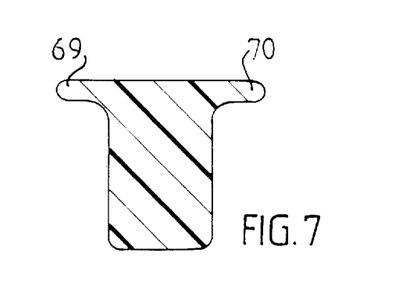
FIG. 7 is an enlarged representation of the cross sectional shape of an elastic clamping ring of rectangular cross section after expansion of the clamping ring to clamping of the jacket.

With reference to FIGS. 6 and 7, it can be seen what happens to a conventional clamping ring of rectangular cross section when it is made to expand radially outward. When the clamping ring is subjected to pressure in the axial direction of the shoe press roll and is made to expand radially, the clamping ring obtains a mushroom-shaped or "chef's cap-shaped" cross section with protruding bulges 69, 70. When the clamping ring is relieved, the bulges 69, 70 theoretically disappear and the clamping ring resumes its rectangular cross section. However, the inventors have found that when the clamping ring is subjected to repeated loadings or when it is loaded during a long period of time, the clamping ring can be permanently deformed in such a way that the bulges 69, 70 become permanent. When the mechanical joint is to be loosened, which is necessary when the flexible jacket is to be replaced, it will be found that the clamping ring remains in a position where it still locks the flexible jacket 3.

Figure 8A:
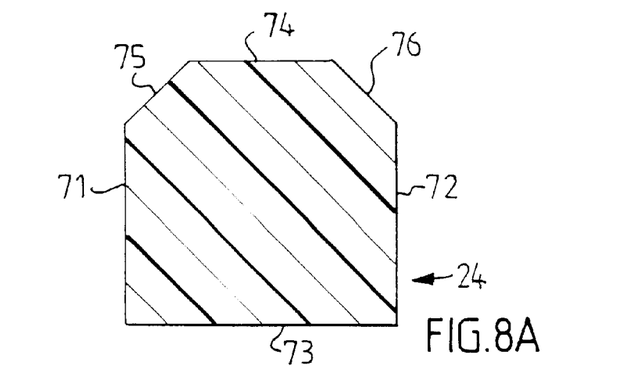
FIG. 8A shows the cross sectional shape of the clamping ring according to the present invention when the clamping ring is in an unloaded condition.

With reference to FIG. 8, the cross section of a preferred clamping ring according to the present invention is shown. This clamping ring has the shape of a hexagon where the sides of the hexagon have different lengths. In cross section, the clamping ring has a first straight side 71, a second straight side 72 which is parallel with the first straight side 71, and a third straight side 73 that connects the first straight side with the second straight side 72. The third straight side 73 is perpendicular to the first straight side 71 and the second straight side 72. A fourth straight side 74 is parallel with the third straight side 73 and perpendicular to the first straight side 71 and the second straight side 72. A fifth straight side 75 connects the first straight side 71 with the fourth straight side 74 and a sixth straight side 76 connects the second straight side 72 with the fourth straight side 74. The straight sides 71–76 thus form a hexagon with sides of different length. However, the first straight side 71 has the same length as the second straight side 72. The fourth straight side 74, that forms an outer side, will be facing the flexible jacket 3 when the clamping ring is used while the third straight side 73, that forms an inner side, will be facing the bottom of the groove 26 when the clamping ring is used.

It will now be understood that the clamping ring will have a first plane side surface corresponding to the first straight side 71 of the cross sectional shape of the clamping ring and a second plane side surface corresponding to the second straight side 72. Furthermore, the elastic clamping ring has a third side surface corresponding to the third straight side 73 of the cross sectional shape of the clamping ring, the third side surface forming one single continuous surface that in its entirety is perpendicular to the first side surface and the second side surface. The third side surface is circular cylindrical and connects the first plane side surface with the second plane side surface. A fourth side surface corresponding to the straight side 74 of the cross section of the clamping ring is perpendicular to the first side surface and to the second side surface. Moreover, the fourth side surface is concentric with the third side surface. A fifth side surface corresponding to the fifth straight side 75 connects the first side surface with the fourth side surface. The fifth side surface has the shape of a cut cone. A sixth side surface corresponding to the sixth straight side 76 connects the second side surface with the fourth side surface. The sixth side surface also has the shape of a cut cone.

Figure 8B:
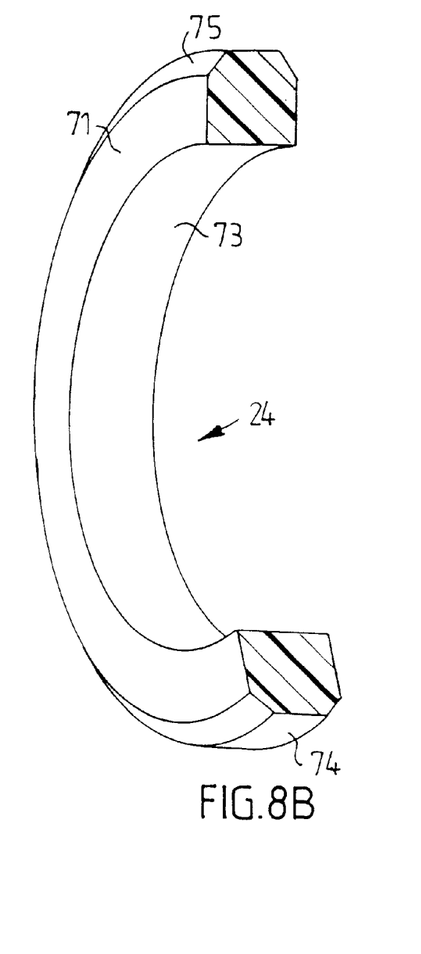
FIG. 8B shows a segment of the clamping ring according to the present invention.
Figure 8C:
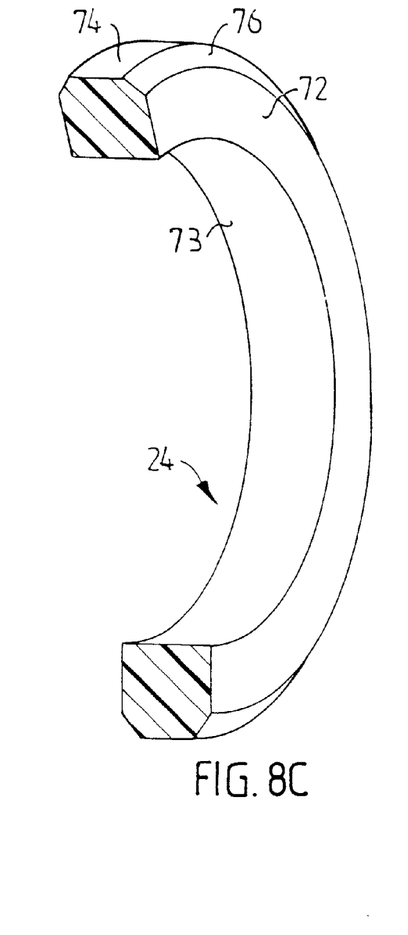
FIG. 8C shows the same segment as FIG. 8B in a different perspective.
Figure 9:
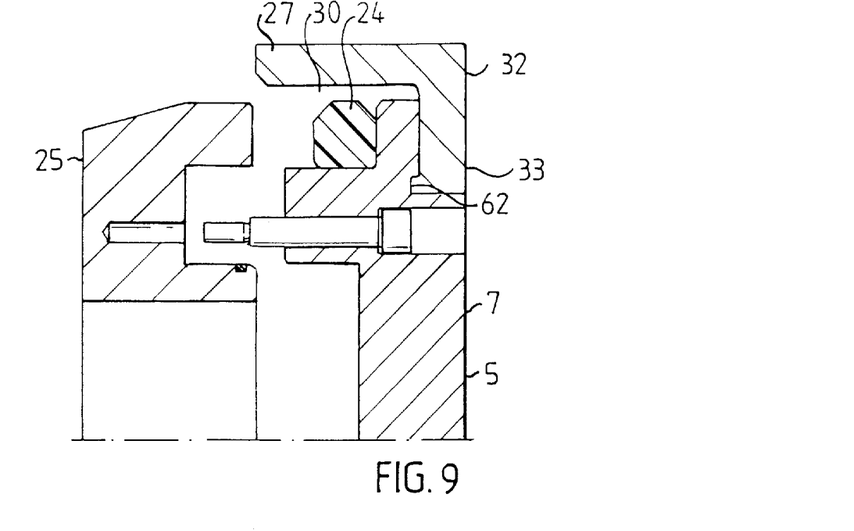
FIG. 9 shows a part of the gable corresponding to FIG. 5 before an elastic clamping ring according to the present invention has been made to expand radially.

With reference to FIGS. 8A, 8B and 8C, a part of the elastic clamping ring 24 is shown where the side surfaces of the ring have been drawn. Each side surface has thereby been given the same reference numeral as the corresponding side of the cross sectional shape of the ring. The first straight side 71 in FIG. 8A thus corresponds to a plane side surface 71 in FIG. 8B, the second straight side 72 according to FIG. 8A to a plane side surface 72 in FIG. 8C, the third straight side 73 according to FIG. 8A to a circular cylindrical surface 73 in FIGS. 8B and 8C, the fourth straight side 74 according to FIG. 8A to a circular cylindrical surface 74 according to FIGS. 8B, 8C and the fifth and sixth straight side surface respectively to surfaces 75, 76 having the shape of cut cones as shown in FIGS. 8B and 8C. However, the sides 75, 76 can also be curved in a plane perpendicular to the plane of the first plane side surface.

With reference to FIG. 10, it is shown what happens when the elastic clamping ring according to the present invention is made to expand radially. Indeed, the ring expands radially but no such bulges 69, 70 are formed as occur when a ring of rectangular shape is used. The fifth and sixth surfaces 75, 76 will also bulge outwardly, but will remain within an envelope defined by imaginary extensions of the planes of the first and second surfaces 71, 72. To the extent that the clamping ring eventually obtains permanent shape changes, for example as a result of being loaded during a long period of time, no problems of unwanted locking of the flexible jacket occur.

Figure 11:
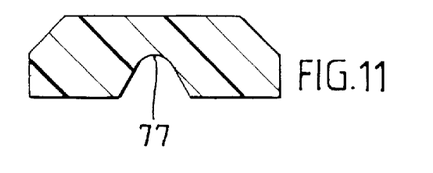
FIG. 11 shows the cross sectional form of a previously known clamping ring having a V-shape.

With reference to FIG. 11, we finally show the cross sectional shape of a previously known elastic clamping ring having a V-shape. Since this cross sectional shape comprises a deep groove 77, the radial expansion of the clamping ring is difficult to control. Moreover, such a cross sectional shape entails undesired problems of strength of material that are eliminated by an elastic clamping ring according to the present invention.

The elastic clamping ring according to the present invention has a cross sectional shape which is formed starting from a square or substantially square cross section. However, the cross sectional shape of the clamping ring according to the present invention deviates from the square cross section in that two of the sides of the clamping ring have bevels as has been described above with reference to the enclosed drawings. However, the clamping ring according to the present invention has a cross section that is similar to a square cross section in that the shortest distance from the third side surface to the fourth side surface is equal to the shortest distance between the first side surface and the second side surface. Hence, the clamping ring does not need to be loaded so much in the axial direction of the shoe press roll in order to achieve sufficient radial expansion of the clamping ring. If the clamping ring had instead been of such a shape that the shortest distance between the third side surface and the fourth side surface was greater than the shortest distance between the first side surface and the second side surface, a higher loading would be required.

With an elastic clamping ring according to the present invention, the risk for undesired locking of the clamping ring is eliminated and the ring obtains good properties of strength and deformation.

That which is claimed:

1. A press roll for an extended nip press in a papermaking machine, said press roll comprising:
   at least one central support shaft;
   a pair of end walls supported on said shaft and defining a rotational axis;
   a stop member connected to a peripherally outer portion of each of said end walls;
   a tubular flexible jacket, said jacket having a liquid-impervious outer surface and a pair of opposed edge portions radially adjacent to each of said stop members;
   a pair of substantially rigid clamping rings each adjacent an end wall;
   a plurality of securing members for urging each rigid clamping ring into clamping engagement with the respective end wall; and
   an elastic clamping ring disposed axially between each of said rigid clamping rings and the respective end wall such that said elastic clamping ring is deformed and radially expands to securely engage the edge portions of said jacket against the respective stop member when said rigid clamping ring is clamped against said end wall by said securing members,
   said elastic clamping ring comprising
      a first side surface,
      a second side surface,
      a cylindrical third side surface connecting said first and said second side surfaces,
      a fourth side surface being disposed adjacent to said jacket,
      a fifth side surface connecting said first side surface and said fourth side surface, and
      a sixth side surface connecting said second side surface and said fourth side surface.

2. A press roll as claimed in claim 1 wherein said first side and second side surfaces are planar and parallel.

3. A press roll as claimed in claim 1 wherein said first side surface and said second side surface are spaced by a shortest distance and said third side surface and said fourth side surface are spaced by a shortest distance and further wherein the shortest distance between said first side surface and said second side surface is equal to the shortest distance between said third side surface and said fourth side surface.

4. A press roll as claimed in claim 1 wherein said first side surface and said second side surface are spaced by a shortest distance and said third side surface and said fourth side surface are spaced by a shortest distance and further wherein the shortest distance between said first side surface and said second side surface is greater than the shortest distance between said third side surface and said fourth side surface.

5. A press roll as claimed in claim 1 wherein said fourth side surface is cylindrical.

6. A press roll as claimed in claim 1 wherein said fourth side surface is cylindrical and coaxial with the rotational axis of the end wall and said first and second side surfaces are perpendicular to the rotational axis.

7. A press roll as claimed in claim 1 wherein said stop member comprises an L-shaped ring, said L-shaped ring being connected to a peripherally outer portion of said end wall by a plurality of bolts extending through said L-shaped member and threadably engaging said end wall.

8. A press roll as claimed in claim 1 wherein said securing members comprise clamping bolts extending through each of said end walls and threadably engaging the respective rigid clamping ring.

* * * * *